United States Patent
Olson

(10) Patent No.: US 6,302,451 B1
(45) Date of Patent: Oct. 16, 2001

(54) QUICK-CONNECT HOSE END COUPLINGS

(75) Inventor: Darwin Olson, Franklin, TN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/525,456

(22) Filed: Mar. 15, 2000

(51) Int. Cl.[7] .................................................. F16L 37/08
(52) U.S. Cl. ........................... 285/330; 285/322; 285/913
(58) Field of Search .................................. 285/243, 330, 285/322, 323, 913, 148.19

(56) References Cited

U.S. PATENT DOCUMENTS

| 5,240,289 | 8/1993 | Gottling et al. | 285/24 |
| 5,284,369 | 2/1994 | Kitamura | 285/322 |
| 5,390,969 | 2/1995 | Guest | 285/38 |
| 5,586,791 | 12/1996 | Kirchner et al. | 285/179 |
| 5,934,713 | 8/1999 | Guest | 285/322 |

*Primary Examiner*—Eric K. Nicholson
(74) *Attorney, Agent, or Firm*—Millen, White, Zelano & Branigan, P.C.

(57) ABSTRACT

A quick-connect coupling for non-rotatably connecting a hose to a male stem member is made of plastic and includes a plastic fitting body on which is mounted a plastic annular cap having depending lugs. The cap is welded or otherwise fixed to the end of the fitting body. A plastic collet is slid into the annular cap. The collet has depending arms which nest between the lugs on the annular cap so that the collet does not rotate. Detents on the arms seat in a groove on the male stem member to retain the stem member within the fitting body.

12 Claims, 4 Drawing Sheets

QUICK-CONNECT HOSE END COUPLINGS

The present invention is directed to quick-connect hose end couplings. More particularly, the present invention is directed to quick-connect couplings wherein the couplings couple hoses to fittings in a non-rotational relationship.

BACKGROUND OF THE INVENTION

Pneumatic devices, such as air brakes, are widely used in the automotive industry. Typically compressed air stored in tanks is applied to air brake operating mechanisms through flexible hoses which have couplings at both ends that couple with male stem members. If the ends tend to twist with respect to one another, collets within the couplings wear quite rapidly which can lead to failure of the collets and thus the coupling.

Current non-rotational couplings have collets in bodies made of brass which tend to wear due to vibration when hoses with which the couplings are used are not pressurized. Moreover, there are plant capacity limitations when brass collets and brass fitting bodies are used. In that brass components are expensive, significant cost reductions are available by not utilizing brass components. In addition, there are advantages to using non-brass components because devices such as hose end bodies which have a 90 degree bend are much easier and less expensive to produce when they are not made of brass.

In addition, there is need to provide a coupling configuration which acts directly on a collet to prevent rotation of the collet when the coupling is engaged as well as arrangements which resist clogging of collets by dirt and foreign objects.

Couplings which are pressurized infrequently but still have significant and continuous vibration applied thereto tend to wear if the collets associated therewith are allowed to rotate or move due to vibration. This phenomenon can reduce the life of coupling components and needs to be addressed.

In view of the aforementioned considerations, there is a need for improvement in hose couplings which have a non-rotational connection with male stem members.

SUMMARY OF THE INVENTION

The present invention is directed to a coupling arrangement or coupling a hose to a male stem having a non-circular end portion and a groove adjacent that end portion. The invention comprises a fitting body having a bore and first end portion adapted for connecting with a hose, and a second end portion adapted to receive the male stem. The body has a non-circular section adapted to receive a non-circular end portion of the stem as well as a sealing section between the non-circular section and the first end portion. A cap member is disposed in fixed relation at the first end of the fitting body, the cap member having axially extending lugs with axially extending spaces therebetween which extend into the bore of the body. A collet is seated within the cap member, the collet having axially extending arms received within the axially extending spaces between the axially extending lugs of the cap wherein the collet is restrained from rotation within the cap. The arms of the cap have a first detent thereon adapted to be received in the groove on the male stem to lock the stem within the fitting body when the collet is in a locked position. A seal is disposed in the sealing section of the fitting body between the lugs and is adapted to engage the male stem in a radial direction.

In accordance with a further aspect of the invention, the collet, body and cap are made of a plastic material.

In further aspects of the invention, the lugs on the cap have inwardly extending ribs for engaging the male stem adjacent the groove in the stem and the arms of the collet have externally projecting ribs which are received on lands in spaces between the axially extending lugs of the cap when the collet is in the locked position. In still further aspects of the invention, the arms and lugs have end faces which face the seal wherein the end faces of the lugs on the cap engage the seal to keep the seal from extruding between the arms of the collet.

BRIEF DESCRIPTION OF THE DRAWING

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
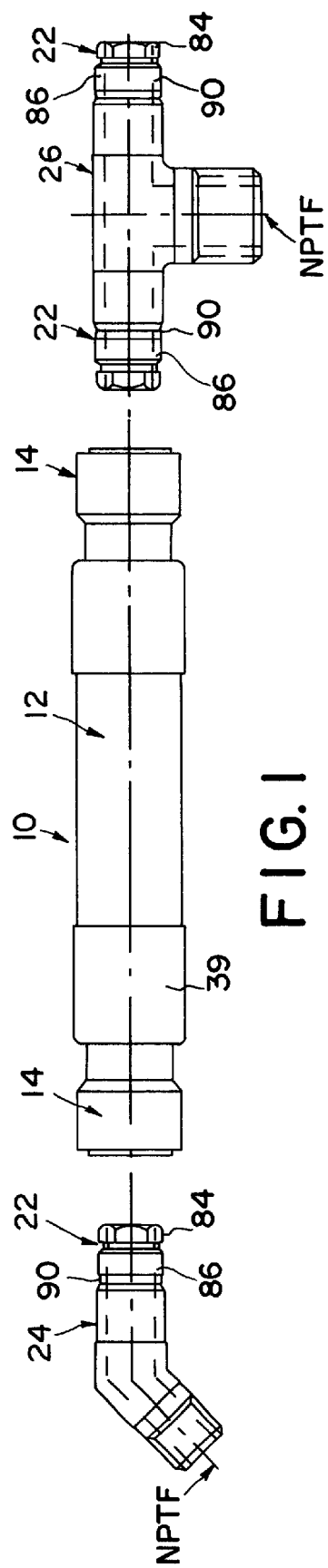
FIG. 1 is a side view of a hose having hose end coupling arrangements with fitting bodies which couple the male stem members.

Referring now to FIG. 1, there is a shown a hose assembly (10) configured in accordance with the principles of the present invention wherein a hose (12) has coupling arrangements (14) at opposite ends (18 and 20) of the hose. The coupling arrangements (14) couple with male stems having coupling portions (22). The male stems may be of various configurations such as the male stem (24) which is obtusely angled, the male stem (26) which is T-shaped, the male stem (28) which is straight or the male stem (30) which is L-shaped.

The coupling portions (22) of the various male stems (24–30) are configured for cooperation with the coupling arrangements (14) at the ends (18 and 20) of the hose (12).

In the illustrated embodiment of the invention, the hose assembly (10) may be used as drop line from the frame rail of a tractor trailer down to a brake chamber, with the hose (12) being of a conventional air brake hose configuration and coupling assemblies (14) being plastic. The male stem members (24–30) are brass machinings. While the illustrated coupling arrangements have a particular use with hose assemblies (10) used for drop lines, the coupling assemblies (14) may be used for any application where a coupling arrangement has a non-rotatable engagement with a male stem. In accordance with features of the present invention, the coupling arrangement (14) is made of plastic material, such as an engineering plastic which for example may be glass filled NYLON® or any other plastic material which is suitable for the desired application.

Figure 2:
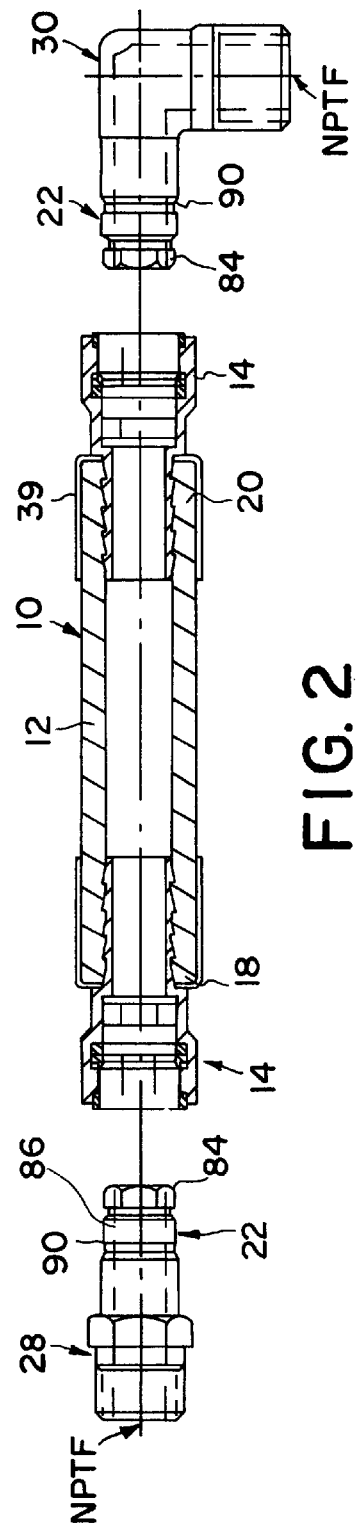
FIG. 2 is a view similar to FIG. 1 but showing the hose and hose end coupling arrangements in elevation with different male stem members than those of FIG. 1.
Figure 3:
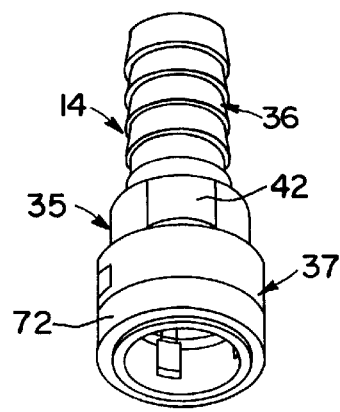
FIG. 3 is a prospective view of a hose end coupling arrangement.
Figure 4:
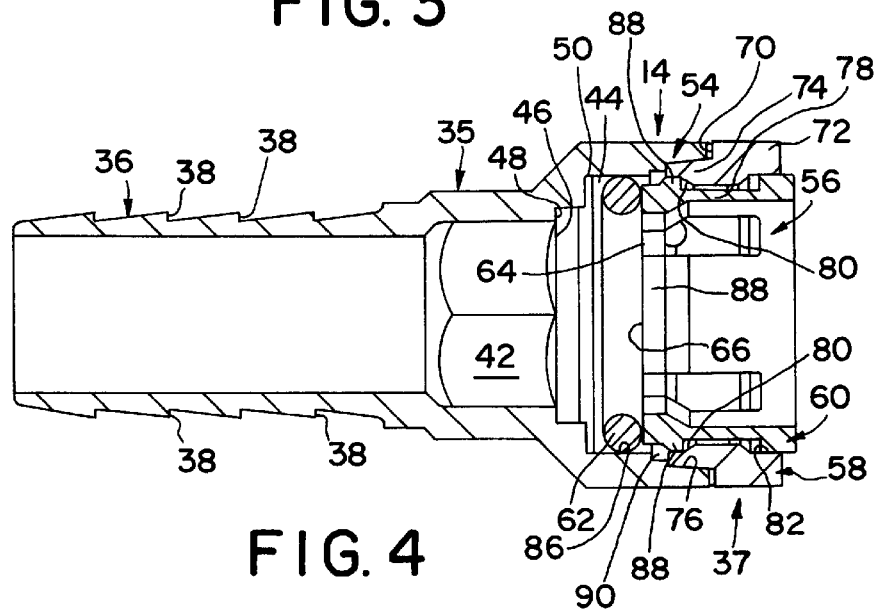
FIG. 4 is a side elevation of the end coupling arrangement of FIG. 3.
Figure 5:
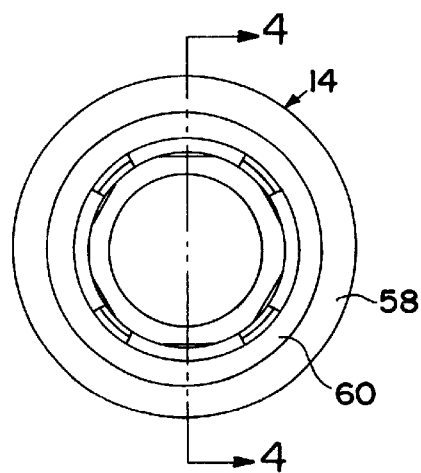
FIG. 5 is an end view of the end coupling arrangement of FIGS. 3 and 4.

Referring now to the enlarged FIGS. 3–5 where the coupling arrangement (14) according to the present invention is shown in isolation, it is seen that the coupling arrangement includes a fitting body (35) having a first end portion (36) and a second end portion (37). The first end portion (36) is received within a hose, such as the hose (12) of FIGS. 1 and 2, while the second end portion (37) couples with the coupling portion (22) of a male stem member such as the male stem members (24–30) of FIG. 1 and 2. The first end portion (36) has a series of annular teeth (38) which grip the material of the hose (12) so as to retain the hose (12) thereon when a collar, such as a crimping collar (39) (FIGS. 1 and 2) squeezes the hose against the annular teeth. Between the first and second end portions (36 and 37) of the fitting body (35) there is disposed a non-circular portion (42) which is shaped as a hexagon, the non-circular portion (42) being joined to a sealing section (44) by a double step (46) which has a first shoulder (48) and a second shoulder (50). Outboard of the sealing section (44) there is a quick-connect coupling section (54) that receives a quick-connect coupling arrangement (56) that is comprised of a cap (58) and a collet (60). A seal is provided by an O-ring (62) which is disposed between the shoulder (50) and ends (64 and 66) of the cap (58) and collet (60), respectively.

In accordance with the present invention, the cap (58) is ultrasonically welded to the second end portion (37) of the fitting body (35) which is accomplished in accordance with known procedures since both the cap (58) and the coupling arrangement (35) are made of plastic material. As is readily seen in FIG. 4, the cap (58) has a step (70) separating an exterior collar portion (72) from an insertion portion (74) wherein the step (70) abuts an end face (76) of the end portion (37) of the coupling arrangement (35). The cap (58) is thus integral with the second end portion (37) and non-rotatably fixed thereon. Alternatively, the cap (58) may be a cap portion that is unitary with the fitting body (35).

The collet (60) is axially slid into the cap (58) and retained therein by external ribs (78) which seat behind a concave surface (80) in the cap (58). After the collet (60) has been axially pushed into the cap (58) it is seen that there is a gap (82) which allows for axial movement of the collet (60) in order to allow for a quick disconnect of the coupling portion (22) of the male stem member from the coupling arrangement (35).

In operation, the male stem member coupling portion (22) which has a non-circular end portion (84) in the form of a hexagon is pushed through the collet (60). The non-circular portion (84) of the male stem coupling portion (22) complements the non-circular portion (42) of the coupling arrangement (35) so that the fittings (24–30) (FIGS. 1 and 2) do not rotate within the coupling arrangement (35) and therefor do not rotate with respect to the hose (12). When the male stem member coupling portion (22) is pushed home, the O-ring reel (62) forms a radial seal against a circular sealing surface (86) on the coupling portion (22) of the male stem member, while detents (88) on the collet (60) seat within the circular groove (90) disposed adjacent the sealing surface (86) so as to lock the coupling portion (22) of the male stem member within the coupling arrangement (14). When it is desired to decouple the hose arrangement (10) from the male stem coupling portion (22), the collet (60) is moved inwardly to close the gap (82) so that the exterior ribs (78) axially clear the end (96, FIG. 9) of the cap (58). This allows the free end portion (66) of the collet (60) to expand outwardly when the coupling portion (22) of the male stem is pulled in a direction axially away from the coupling arrangement (14).

Figure 6:
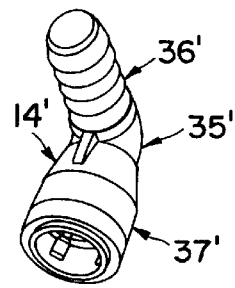
FIG. 6 is a prospective view of another embodiment of an end coupling arrangement in accordance with the present invention.
Figure 7:
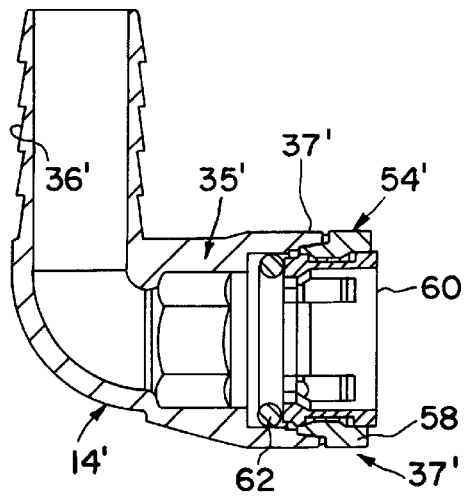
FIG. 7 is a side elevation of the end coupling arrangement of FIG. 6.
Figure 8:
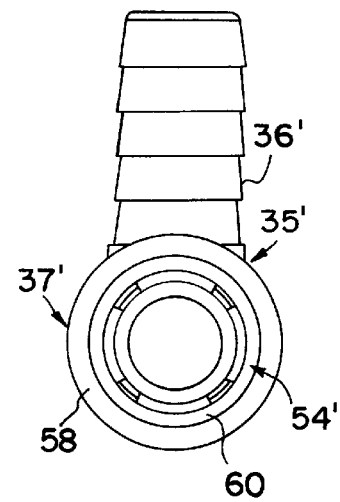
FIG. 8 is an end view of the end coupling arrangement of FIGS. 6 and 7.

Referring now to FIGS. 6–8 where a second embodiment (14') of the coupling arrangement is shown, it is seen that the coupling arrangement is L-shaped with a 90 degree bend so that the first end portion (36') is perpendicular to the second end portion (37'). The coupling arrangement (14') of the second embodiment is substantially the same as the coupling arrangement (14) shown in FIG. 4 of the first embodiment in that the quick-connect portions (54) and (54') and the non-circular portions (42) and (42') are the same. There is an enormous economic advantage in making the fitting body (14') L-shaped because it is far less expensive to mold a fitting body from the plastic material than to machine a brass fitting. By making the fitting body (14') L-shaped, the male stem member can be made straight so that instead of using the L-shaped male stem member (30) of FIG. 2 an L-shaped fitting body (14') can be used in combination with a straight male stem member, such as the male stem member (28) of FIG. 2.

Figure 11:
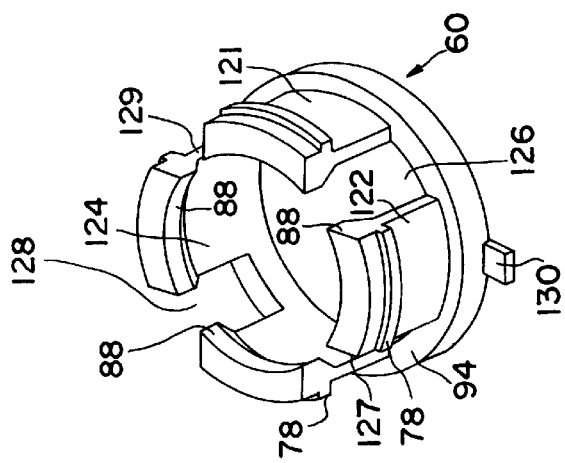
FIG. 11 is a prospective view of a collet which cooperates with the cap of FIGS. 9 and 10 to provide the coupling arrangement of FIGS. 1–8.
Figure 10:
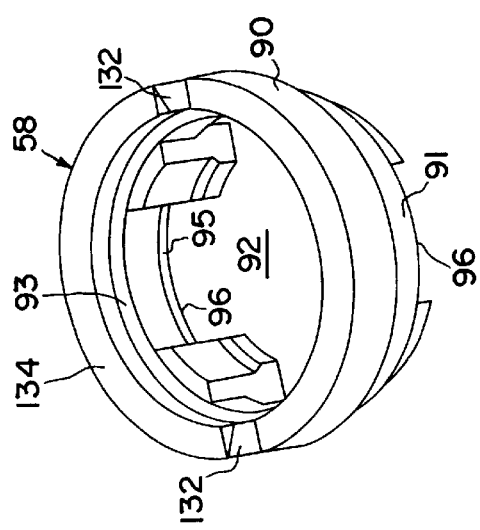
FIG. 10 is a prospective view of the other end of the cap of FIG. 9.
Figure 9:
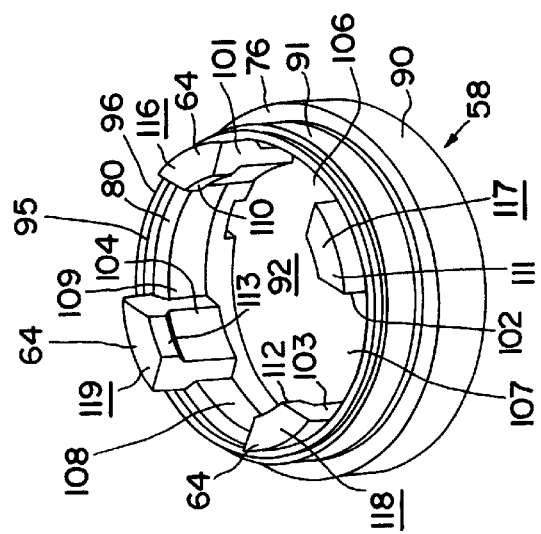
FIG. 9 is a top prospective view of a cap used with the coupling arrangement of FIGS. 1 through 8.

Referring now to FIGS. 9 and 10 in combination with FIG. 11 where the cap (58) and the collet (60) are shown isolated and in perspective, it is seen that the cap (58) has a collar portion (90) which extends axially past the axially-facing, radially-extending shoulder (76) and an inwardly extending collar (91) which projects inwardly from the radially-facing shoulder. The inwardly extending collar (91) engages the inner surface of the fitting body (35) (see FIGS. 4 and 7) while the collar (90) projects outwardly from the fitting body to help define an annular space (92) which receives the collet (60) therewithin. Within the collar (90) there is a shoulder (93) which axially faces a corresponding shoulder (94) on the collet (60) (see FIG. 11). The shoulder (93) serves as a stop when the collet (60) is pressed inwardly to clear the rib (78) from engagement with the cap at an axially-extending shoulder (95) when the collet (60) is pressed inwardly, in order to remove the male stem coupling (22) in order to disconnect the hose assembly (10) (FIGS. 1 and 2) from one of the male stem members (24–30).

The cap (58) has four axially-extending lugs (101, 102, 103 and 104). Between these lugs are spaces (106, 107, 108 and 109). The lugs (101–104) have inwardly projecting ribs (110–113) which engage and steady the male stem coupling (22) as it is slid into place by abudding the sealing surface (86) of the male stem coupling. Once the coupling (22) is seated, the ribs (110–113) are positioned over the groove (90) of the male stem coupling (22) but are not received in the groove. The lugs (101–104) have end faces (116–119) which face the O-ring (62) (see FIGS. 4 and 7). As will be explained further, these end faces (116–119) prevent the O-ring from extruding into the collet (60) and interfering with the integrity of the coupling arrangement (14).

Referring now mainly to FIG. 11, it is seen that the collet (60) has axially extending arms (121–124) with spaces (126–129) therebetween. When the collet (60) is slid into the cap (58), it is slid in so that the lugs (101–104) are received in spaces (126–129) of the collet and so that the arms (121–124) are received in the spaces (106–109) of the cap (58). Consequently, the collet nests within the cap (58) as is shown in FIGS. 4 and 7. The surface (80) is concave in that it slopes inwardly, consequently any pulling force on the male stem coupling (22) causes the surface (80) to cam the detents (88) more tightly into the groove (90) by progressively providing a radial force against the external ribs (78).

Since the spaces (126–129) are filled with the lugs (101–104) the tendency of the O-ring seal (62) to extrude between the arms (121–124) of the collet (60) is precluded. A pair of tabs (130) (only one of which is shown in FIG. 11) are received in grooves (132) in the exposed end face (134) of the cap (58) to facilitate initial alignment of the arms (121–124) with the spaces (106–109) between the lugs on the cap (58). The tabs (130) are flexible and fit into the slots (132) to assure that the collet (60) is in the locked position at all times regardless of whether or not the hose assembly (10) is pressurized or not. To disconnect the male stem coupling (22), the tabs (130) flex when the collet (60) is depressed when pushed toward the fitting body (35). Since the rim (30) helps assure that the collet (60) will be firmly squeezed against the male stem when excess pressure or an axial of load is applied to the hose, the tabs (130) may replace the rim (80) since the tabs (130) serve the same function.

In addition to the lugs (101–104) preventing rotation of the collet (60) and keeping the O-ring seal (62) from extruding into the collet, the lugs reduce the possibility of dirt and foreign objects entering the fitting body (35) through the gaps (126–129) of the collet while the ribs (110–113) engage against the male stem (22) to provide a retraction force on the stem which is preloaded into the fitting body (35), thereby ensuring that the collet (60) remains in the locked position even when the hose assembly (10) is not pressurized.

From the foregoing description, one skilled in the art can easily ascertain the essential characteristics of this invention and, without departing from the spirit and scope thereof, can make various changes and modifications of the invention to adapt it to various usages and conditions.

Upon further study of the specification and appended claims, further objects and advantages of this invention will become apparent to those skilled in the art.

What is claimed is:

1. A coupling arrangement for coupling a hose to a male stem having a non-circular end portion thereon and a groove therein, comprising:
    a body having a first end portion adapted for connecting with a hose and a second end portion adapted to receive the male stem; the body having a non-circular section adapted to receive the non-circular end portion of the male stem as well as a sealing section between the non-circular section and the first end portion;
    a cap member non-rotationally fixed at the first end of the body, the cap member having axially extending lugs with axially extending spaces therebetween;
    a collet seated within the cap, the collet having axially extending arms received within the axially extending spaces between the axially extending lugs of the cap, wherein the collet is restrained from rotation within the cap and fitting body, the arms having first detents therein adapted to be received in the groove on the stem, and
    a seal disposed in the sealing section of the body adjacent to the lugs and adapted to engage the male stem in a radial direction.

2. The coupling arrangement of claim 1, wherein the lug and arms have ends which terminate at an axial location adjacent the seal.

3. The coupling arrangement of claim 1, wherein the lugs on the cap have inwardly extending ribs for engaging the stem adjacent the groove in the stem.

4. The coupling arrangement of claim 1, wherein the arms of the collet have externally projecting ribs which are received in spaces between the axially extending lugs of the cap when the collet is in the locked position.

5. The coupling arrangement of claim 1, wherein the fitting, cap and collet are made of plastic material.

6. The coupling arrangement of claim 1, wherein the arms and lugs have end faces which face the seal and wherein the end faces on the arms of the collet are axially displaced away from the seal when the collet is in the locked position, wherein the end faces of the lugs on the cap hold the seal spaced from the end faces of the arms on the collet.

7. The coupling arrangement of claim 1, wherein the collet has a pair of radially extending tabs which are received in radially extending slots on an exposed face of the cap.

8. A coupling arrangement for coupling a hose to a male stem having a non-circular end portion thereon and a groove therein, comprising:
    a body of plastic material having a first end portion adapted for connecting with a hose and a second end portion adapted to receive the male stem; the body having a non-circular section adapted to receive the non-circular end portion of the male stem as well as a sealing section between the non-circular section and the first end portion;
    a cap member of plastic material non-rotationally fixed at the first end of the body, the cap member having axially extending lugs with axially extending spaces therebetween;
    a collet of plastic material seated within the cap, the collet having axially extending arms received within the axially extending spaces between the axially extending lugs of the cap, wherein the collet is restrained from rotation within the cap and fitting body, the arms having first detents therein adapted to be received in the groove on the stem, and
    a seal disposed in the sealing section of the body adjacent to the lugs and adapted to engage the male stem in a radial direction.

9. The coupling arrangement of cliam 8, wherein the male stem is made of metal.

10. The coupling arrangement of claim 8, wherein the male stem is made of brass.

11. The coupling arrangement of claim 10, wherein the second end portion extends at 90° with respect to the first end portion.

12. The coupling arrangement of claim 8, wherein the second end portion extends at 90° with respect to the first end portion.

* * * * *